Oct. 21, 1924.
H. C. WIDLAKE
1,512,385
FLUID PRESSURE INDICATOR
Filed March 8, 1921
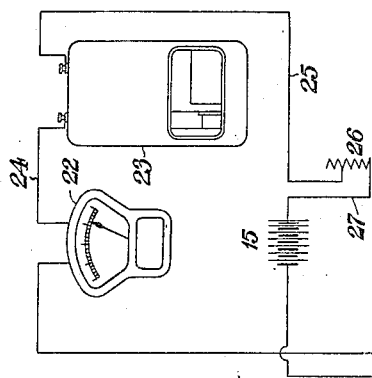
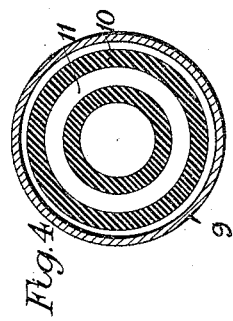
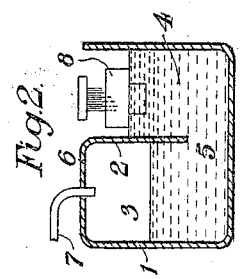
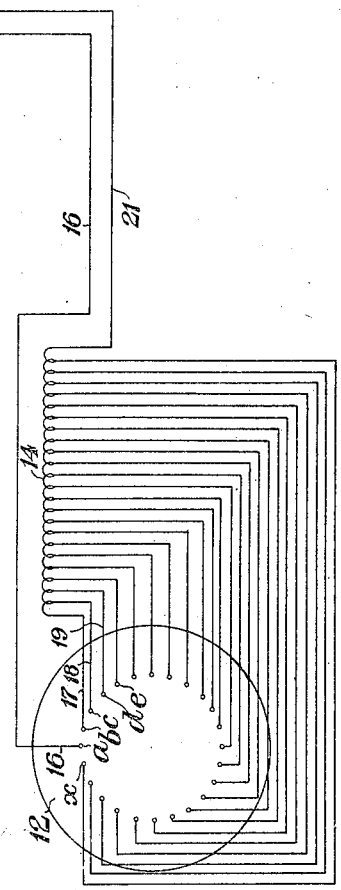
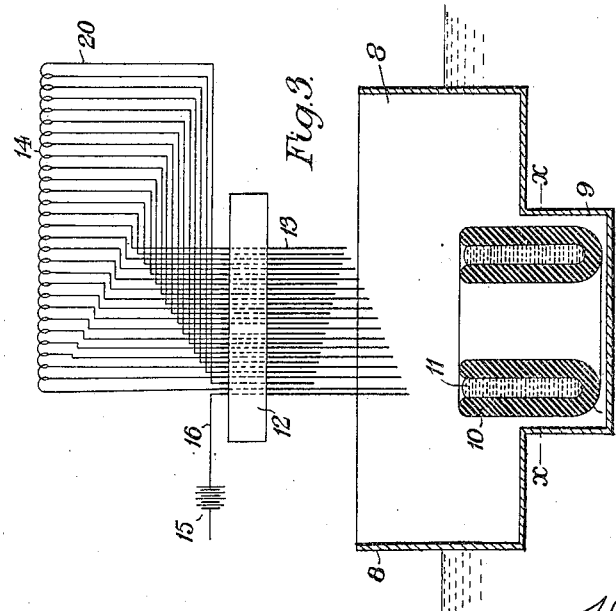
INVENTOR:
Herbert C. Widlake
By Wm Wallace White
ATTY.

Patented Oct. 21, 1924.

1,512,385

UNITED STATES PATENT OFFICE.

HERBERT COURTENAY WIDLAKE, OF PLYMOUTH, ENGLAND.

FLUID-PRESSURE INDICATOR.

Application filed March 8, 1921. Serial No. 450,794.

*To all whom it may concern:*

Be it known that I, HERBERT COURTENAY WIDLAKE, of Mutley, Plymouth, England, a subject of the King of Great Britain and Ireland, have invented a certain new and useful Fluid-Pressure Indicator, of which the following is a specification.

This invention relates to means for measuring, indicating, and registering at a desired or predetermined point the pressure exerted by a fluid or liquid at any part or region, distant from said point, of a fluid or liquid system.

An instrument of the U-tube type has heretofore been proposed for measuring and indicating differences of fluid pressure in a conduit traversed by a fluid to be metered, in which a float is disposed floating upon mercury in one leg of the U-tube and the movement of the float is mechanically transmitted through multiplying gearing to a movable part in the other leg of the U upon which a set of resistances is mounted, the said resistances being arranged in an electric indicating circuit and connected to a series of bare contacts in such a manner as to successively make or break contact with the mercury in the instrument according as the float rises or falls, and thus to vary the resistance of the said circuit in accordance with the difference of fluid pressures acting upon the instrument. This type of instrument is described in Patent #1,359,846, granted to L. A. Sheldon, dated November 23, 1920.

In the known apparatus referred to the movement of a column of mercury acted upon by the pressure is multiplied by means of rack gearing so as to give a widely spaced reading on an indicating dial and the said gearing necessarily increases the friction affecting the working and accuracy of the gauge.

The object of my present invention is to provide an improved pressure indicating apparatus designed to transmit accurate measurements, indications, and registrations from the most remote parts of a fluid or liquid system to any central office or other part of the system where the variations in pressure occurring at such remote parts are required to be noted, without requiring any movable gearing and substantially without friction in the moving parts.

With this object in view I employ a water column in the U-tube of my fluid pressure indicator and a conducting liquid contact, such as mercury, carried in a vessel floating on the water column in one leg of the U-tube. This combination forms an extremely sensitive and accurate pressure measuring device. For example the device is approximately thirteen times more sensitive than would be the case if the liquid column consisted of mercury as in the instrument described in the patent hereinabove referred to.

The use of the water column regarded alone is not claimed as my invention as the same has been proposed before in a different combination, but I claim as the chief feature of novelty of my invention the combination, partly stated just above, of a water column with a conducting liquid contact carried in a vessel floating on the water and co-acting with a series of downwardly directed bare contact taps of different lengths connected to corresponding points in a resistance included in an indicating circuit.

In considering the practical value of this combination it must be understood that this pressure indicator is specially designed for use with an ordinary town gas distribution system in which the pressure employed, and the variations of pressure occurring, is and are very slight. In the most modern practice the maximum pressure rarely exceeds that represented by a column of water of 5 inches in length and the minimum pressure is rarely less than that represented by a water column of 2 inches. These limits, stated in the more generally employed units, correspond to pressures varying between .07 and .17 pound per square inch. With such low pressures and slight variations only the most sensitive and accurate indicating apparatus will give correct readings.

In order that the nature of the invention may be clearly understood an arrangement comprising the improved pressure registering apparatus will now be described by way of illustration with the aid of the accompanying drawings, in which—

Fig. 1 is a diagram of the electric connections employed;

Fig. 2 shows a suitable form of tank with dividing plate for use as a U-tube device in connection with this invention;

Fig. 3 is a diagrammatic representation of a form of float chamber adapted to float on one part of the tank shown in Fig. 2, and Fig. 4 is a sectional plan view on the line x—x of Fig. 3 of the mercury container forming part of the float chamber.

Referring to the drawings, which illustrate the application of the invention to a gas supply system for example, a small tank 1 which may be circular or of any other desired form (see Fig. 2) and which is divided by a partition 2 into two compartments 3 and 4, is provided conveniently near to a part of the gas supply pipe system, the pressure prevailing at which is required to be continuously under observation by a person in the gas works or in any other office or building at a considerable distance from the said part of the system. The compartment 3 of the tank 1 is in communication with the compartment 4 by the passage 5 through or under the lower part of the partition 2 and the upper part of the compartment 3 is completely closed in by a cover 6. A sufficient quantity of water is poured into the tank 1 through compartment 4 to raise the level of the water therein above the passage 5 as shown so that the space above the water level in compartment 3 is completely enclosed on all sides. This compartment 3 is connected by a pipe 7 passing gas-tight through the cover 6, to that part of the gas supply system the pressure at which and the variations thereof are required to be noted in the gas works, for example, which may be many miles distant from the said part of the system.

In the other compartment 4 of tank 1 a float chamber 8 is provided containing a moving mercury contact device adapted to co-act with a set of fixed electric contacts arranged at different heights above the level of the mercury in the said moving contact device, these fixed contacts being connected to a corresponding series of taps in an electric resistance which is connected by a wire to indicating and recording instruments in the said gas works as hereinafter described. A suitable form and arrangement of float chamber with a moving mercury contact device and fixed contacts co-acting therewith is shown on an enlarged scale in Fig. 3.

Referring to Figs. 3 and 4, the float chamber 8 may be made of aluminium or any suitable light metal or other material and in the construction shown is circular in form. The bottom of the float chamber is provided with a recess 9 adapted to receive a circular double-wall mercury container 10 which may be of porcelain the annular channel 11 of which is filled with mercury. The float chamber 8 carrying the mercury container 10 is so arranged to float upon the water in the compartment 4 of the tank 1 that the said float chamber is free to move up and down with the rise and fall of the level of the water contained in the said compartment 4.

Immediately over the float chamber and concentric with the mercury container 10 therein a disc plate, or the like 12 of insulating material is firmly secured in which a number of downwardly directed contact needles of varying lengths are fixed constituting a nest 13, these needles being arranged in a circle in the disc 12 concentric with the mercury container 10 and described with a radius extending from the axis of the said container to any point half way between the two inner surfaces of the sides of the mercury channel 11, so that as the float chamber 8 and mercury container 10 ascend with the rise of the water level in compartment 4 the downwardly directed points of the nest of needles 13 will successively make contact with the mercury contained in the channel 11 of the container 10. In the preferred form I arrange the needles 13 according to their lengths so that the contact points of the same describe a spiral in the manner illustrated in Fig. 3.

Conveniently near to the disc 12 a bank or set of graduated resistances 14 is arranged and at any convenient place, either near to the tank 1 or near to or within the distant gas works, or elsewhere, a source of electric current is provided which is shown merely for illustration as a battery 15. The nest of contact needles 13 are connected by wires for instance by telephone or telegraph wires with the battery 15 and the bank of resistances 14 in the following manner. The longest needle $a$ (see Fig. 1) is directly connected by a wire 16 to one pole of the battery 15; the next longest needle $b$ is connected by a wire 17 to one end of the resistance bank 14; the next longest needle $c$ is connected by a wire 18 to the first graduation of the resistance bank 14; the next longest needle $d$ is connected by a wire 19 to the next graduation tap of the said resistance bank, and so on, the last or shortest needle $x$ being connected by a wire 20 to the other end of the resistance 14. This end of the resistance is also connected by a wire 21 to an indicating milliampere meter 22 which is connected in series with a recording milliampere meter 23 by a wire 24, the other side of the meter 23 being connected by a wire 25 to a temperature adjusting resistance 26 and thence by a wire 27 to the opposite pole of the battery 15.

In the operation of the above described apparatus the pressure of the gas admitted to the compartment 3 of the tank 1 causes the level of the water in said compartment to sink and that of the water in the other compartment 4 to rise, thus raising the float chamber 8 and the mercury container 10 to a certain extent dependent upon the said gas pressure in compartment 3. On the longest needle $a$ of the nest 13 making contact with the mercury in the channel 11 one pole of the battery 15 is connected through wire 16 and needle $a$ with the mercury in the channel 11. On the gas pressure rising in the compartment 3 sufficiently to cause the mercury in the channel 11 to make contact with the next longest needle $b$ the whole of the resistance bank 14 and the meters 22 and 23 are connected in circuit with the battery 15 through the mercury in channel 11. On the gas pressure in the compartment 3 rising still further so that the next longest needle $c$ of the nest 13 makes contact with the mercury in channel 11 a resistance unit is cut out of the circuit thus increasing the current flowing through the indicating and recording instruments 22 and 23 respectively. In this manner, by calibrating the two instruments 22 and 23 in the desired units, the gas pressure and variations of the gas pressure in the compartment 3, and hence also prevailing and occurring at the distant part of the gas supply system, may be continuously noted at the gas works or other desired place.

The object of the temperature adjusting resistance 26 is as follows: The resistance of any electrical circuit varies with the temperature. If the apparatus has been placed in operation and adjusted in, for example, the coldest part of the year it will be evident that when the hot season arrived inaccuracies would be caused by the resistances in the apparatus itself and the resistance of the telephone or other line being changed. By means of the resistance 26 occasional adjustments of the total resistance in circuit can be made at the different seasons of the year.

Experience proves that in any form of mercury switch a certain amount of fouling takes place upon the contact points. The construction of the mercury switch hereinabove described and illustrated in the drawings is so designed as to permit of the entire nest of contact points being readily removed and replaced without removing any other part.

What I claim and desire to secure by Letters Patent is:—

1. Fluid pressure measuring device for indicating variations of pressure at a distant point, comprising in combination, a U-tube device, a water column therein, a vessel floating on the water column, a conducting liquid contact carried by the said vessel, an electric circuit comprising a source of current, a bank of resistance elements and an instrument responsive to variations in the resistance of the circuit, and a series of downwardly directed bare contact taps of different lengths fixed over the liquid contact and connected to the bank of resistance elements, the length of said contact taps increasing gradually from one end of said bank to the other.

2. Fluid pressure measuring device comprising in combination a U-tube device, a water column therein, a vessel floating on the water column, a recess in the bottom of the said vessel, a mercury contact container in the said recess, an electric circuit comprising a source of current, a bank of resistance elements and an instrument responsive to variations in the resistance of the circuit, and a circularly arranged series of bare contact taps of graduated lengths fixed coaxially over the said mercury container and connected to successive points in the bank of resistance elements, the free ends of said contact taps forming a spiral.

In testimony whereof I have signed my name to this specification.

HERBERT COURTENAY WIDLAKE.